(12) United States Patent
Werle et al.

(10) Patent No.: US 11,067,540 B2
(45) Date of Patent: Jul. 20, 2021

(54) METHOD AND DEVICE FOR CHECKING AN OBJECT FOR FLAWS

(71) Applicant: NDT Global Corporate Ltd. Ireland, Dublin (IE)

(72) Inventors: Michael Werle, Dublin (IE); Thomas Hennig, Dublin (IE); Peter Haberl, Dublin (IE)

(73) Assignee: NDT Global Corporate Ltd. Ireland, Dublin (IE)

( * ) Notice: Subject to any disclaimer, the term of this patent is extended or adjusted under 35 U.S.C. 154(b) by 93 days.

(21) Appl. No.: 16/462,095

(22) PCT Filed: Nov. 15, 2017

(86) PCT No.: PCT/EP2017/079354
§ 371 (c)(1),
(2) Date: May 17, 2019

(87) PCT Pub. No.: WO2018/091548
PCT Pub. Date: May 24, 2018

(65) Prior Publication Data
US 2020/0300815 A1    Sep. 24, 2020

(30) Foreign Application Priority Data
Nov. 18, 2016  (DE) .......................... 102016122230.5

(51) Int. Cl.
*G01N 29/40* (2006.01)
*G01N 29/11* (2006.01)

(52) U.S. Cl.
CPC ............. *G01N 29/11* (2013.01); *G01N 29/40* (2013.01); *G01N 2291/106* (2013.01)

(58) Field of Classification Search
CPC ...... G01N 29/11; G01N 29/40; G01N 29/043; G01N 29/343; G01N 29/2487;
(Continued)

(56) References Cited

U.S. PATENT DOCUMENTS

| 3,512,400 A | 5/1970 | Lynnworth |
| 4,137,779 A | 2/1979 | Wustenberg et al. |

(Continued)

FOREIGN PATENT DOCUMENTS

| EP | 0177053 B1 | 8/1991 |
| JP | 2015172495 A | 10/2015 |
| WO | 2008010712 A1 | 1/2008 |

OTHER PUBLICATIONS

Kroher Strobel, Observations by third party filed with the German Patent and Trademark Office on Apr. 8, 2019, 22 pages.
(Continued)

*Primary Examiner* — Jacques M Saint Surin
(74) *Attorney, Agent, or Firm* — Greenberg Traurig, LLP

(57) ABSTRACT

The invention relates, in a first aspect, to a method for inspecting an object, in particular a pipeline, for flaws, comprising: emitting a first signal toward the object in a first direction by means of a first ultrasonic transducer; and receiving a first response signal coming from the object from a second direction by means of a second ultrasonic transducer, wherein the first direction and the second direction are different from each other.

9 Claims, 1 Drawing Sheet

(58) Field of Classification Search
CPC ....... G01N 2291/106; G01N 2291/015; G01N 2291/0234; G01N 2291/102; G01N 2291/056; G01N 2291/2636; G01N 2291/0422; G01N 2291/044
USPC .......................................................... 73/600
See application file for complete search history.

(56) References Cited

U.S. PATENT DOCUMENTS

| | | | | |
|---|---|---|---|---|
| 4,658,649 A * | 4/1987 | Brook | .................... | G01N 29/11 73/624 |
| 4,674,334 A * | 6/1987 | Chimenti | .............. | G01N 29/041 73/627 |
| 5,629,485 A * | 5/1997 | Rose | ....................... | B64D 15/20 73/170.26 |
| 6,293,067 B1 * | 9/2001 | Meendering | .......... | E04B 2/8652 52/426 |
| 6,332,361 B1 | 12/2001 | Yamada et al. | | |
| 6,474,165 B1 | 11/2002 | Harper et al. | | |
| 7,694,566 B2 * | 4/2010 | Kleinert | ............. | G01N 29/0609 73/606 |
| 8,051,717 B2 * | 11/2011 | Fukutomi | ............... | G01N 29/07 73/598 |
| 8,225,668 B2 * | 7/2012 | Yabushita | ............ | G01N 29/223 73/624 |
| 8,783,111 B2 * | 7/2014 | Matsumoto | .......... | G01N 29/043 73/632 |
| 10,527,586 B2 * | 1/2020 | Phillips | ............... | G01N 29/2412 |
| 2003/0136195 A1 | 7/2003 | Krieg et al. | | |

OTHER PUBLICATIONS

German Patent Office, Office Action issued on German patent application No. 10 2016 122 230.5, dated Jul. 18, 2017, 7 pages.

H. Licht et al., Mapping the Ultrasonic Defect Shadow in a Pitch-Catch Mode, dated May 1981, 15 pages.

ISA/EP, Int. Search Report issued on PCT application No. EP2017/079354, dated Jan. 31, 2018, 3 pages.

* cited by examiner

METHOD AND DEVICE FOR CHECKING AN OBJECT FOR FLAWS

TECHNICAL FIELD

The present invention relates to a method and a device for checking an object for flaws.

BACKGROUND

Checking of an object for flaws is relevant in many technical areas.

For example, in respect of pipelines intended for the transport of a fluid, in order to guarantee transport with no loss as far as possible, apart from a final check of the pipeline after its fabrication/assembly, it is essential to examine the pipeline for flaws at certain intervals of time or after the discovery of a leak.

For this purpose, the pipeline to be examined can be tested non-destructively and in situ for example by means of ultrasound, magnetic flux leakage or eddy current. In such a test, for instance, an arrangement of ultrasonic transmitters and receivers is mounted on what is known as a pig and the pig is inserted into the line. The pig then travels through the pipeline and picks up the sensor signals as function of the distance covered. After the end of the examination or even during it the stored sensor signals can be read and analysed.

In this connection, through perpendicular irradiation of for example ultrasound relative to the pipe wall, material losses (e.g. due to corrosion) and other flat defects lying parallel to the pipe wall can be detected (wall thickness measurement). Through oblique irradiation cracks and other defects lying perpendicular to the pipe wall can be detected (crack testing).

One method used in particular for crack testing is that known as the (im)pulse-echo method. In this connection the emitted sound wave is scattered and reflected partly or completely on flaws. A returning echo is received accordingly and is converted into a crack depth. However, this method shows a saturation behaviour with cracks of more than approx. 4 mm. Therefore, to date no accurate and absolute statements regarding cracks with larger crack depths have been possible with this method. Moreover, the sensitivity of this method decreases in relation to defects not orientated radially/axially with increasing misposition.

The ability to carry out crack testing with greater accuracy and over a wider range can therefore be identified as an object to be achieved.

OUTLINE OF THE INVENTION

A first aspect of the invention relates to a method for inspecting an object, in particular a pipeline, for flaws, wherein the method comprises the following steps:

emitting of a first signal running in a first direction in the object by means of a first ultrasonic transducer; and receiving of a first response signal coming from a second direction in the object by means of a second ultrasonic transducer, wherein the first direction and the second direction are different from each other.

This aspect is based on the surprising finding that crack testing can be carried out with greater accuracy with the help of this method/geometry. A further component of the underlying finding of the invention is the fact that the first response signal can be used to detect a flaw. In particular defects not orientated radially/axially can be detected better and in some cases can simply be detected with the help of this coordinated pair of transducers. With the help of this method, for instance in the case of a pipeline, cracks can be detected both on the outside and on the inside. Furthermore "mid-wall" defects not connected with the surface are also detectable with it.

The first signal running in the first direction in the object and the first response signal coming from the second direction relate preferably to (propagation) directions of these signals, which they have immediately after entry (in the case of the first signal) and before exit (in the case of the first response signal) from the object. In between reflections, diffractions or so-called skips are possible inside the object or on the surfaces/interfaces of the object. The same applies also to the further signals mentioned below. Particularly preferably the first direction and/or the second direction have a respective propagation component perpendicular to one of the surfaces of the object. In particular this can be achieved by the signals being irradiated or received from outside the object.

The first and second transducers can each be designed as independent ultrasonic transducers, which can in particular be designed and arranged to be (physically) separate from each other. Alternatively, they can also each be designed in the form or as part of a phased-array arrangement. The transducers can be for example piezo transducers, which are arranged at a certain distance from the object and emit the first signal onto a first surface of the object and receive the first response signal coming from the first (or another) surface of the object. In this case a contact medium serves to transmit the signals between the transducer and the object—in a pipeline to be examined for example a fluid flowing through the pipeline. Alternatively, however, electromagnetic-acoustic transducers can also be used.

The method can further comprise the step of the arranging of the first ultrasonic transducer and of the second ultrasonic transducer on the same side of the object. In a pipeline inspection both transducers are preferably arranged on the inside of the pipeline in this connection. Preferably the first ultrasonic transducer and/or the second ultrasonic transducer are arranged at a distance from the object, i.e. without standing in contact with the object.

In this connection the first direction and the second direction can each form substantially the same angle (except for mathematical sign) with the side of the object facing the ultrasonic transducers.

The method can further comprise the additional step of the receiving of a second response signal coming from the first direction in the object, in response to the first signal, by means of the first ultrasonic transducer. To improve the accuracy, a pulse-echo method can thus also be used.

The method further can comprise the following steps:

emitting of a second signal running in the second direction in the object by means of the second ultrasonic transducer; and receiving, in response to the emitting of the second signal, of a third response signal coming from the first direction in the object by means of the first ultrasonic transducer.

In this way it is possible to insonify the object in "reverse" direction. From the comparison of the measurement results and in particular of the time evolution of the amplitude of the measurement signal in forward and backward direction in particular in comparison with the pulse-echo signal valuable (additional) information can be obtained, in particular in relation to an oblique position of a crack.

The method can comprise further the additional step of the receiving of a fourth response signal, coming from the second direction and induced by the second signal, by means of the second ultrasonic transducer.

The method can also comprise the step of the storing and evaluating of the first, second, third and/or fourth response signal to characterise a flaw. Alternatively, or additionally the device can for example comprise a transmitting-receiving unit, to exchange the received signals/data with a remote evaluation unit immediately or with a time delay (after intermediate storage in a buffer storage facility).

A second aspect of the present invention relates to a device for inspecting an object, in particular a pipeline, for flaws, comprising:

a first ultrasonic transducer, which is configured to emit a first signal running in a first direction in the object; and a second ultrasonic transducer, which is configured to receive a first response signal coming from a second direction in the object, wherein the first direction and the second direction are different from each other.

The first ultrasonic transducer and the second ultrasonic transducer can be arranged on the same side of the object. In this connection preferably the first direction and the second direction each form substantially the same angle with the side of the object facing the ultrasonic transducers, i.e. for example the inside of the pipe of the pipeline to be inspected.

The first ultrasonic transducer can be configured to receive a second response signal coming from the first direction in the object, in response to the first signal.

Furthermore, the second ultrasonic transducer can be configured to emit a second signal running in the second direction in the object, wherein the first ultrasonic transducer is configured to receive a third response signal coming from the first direction in the object by means of the first ultrasonic transducer, in response to the emitting of the second signal. The second ultrasonic transducer can further be configured to receive a fourth response signal coming from the second direction and induced by the second signal.

The device can comprise a storage facility and an evaluation unit to store and evaluate the first, second, third and/or fourth response signal to characterise a flaw.

Alternatively, or additionally the device can comprise for example a transmitting-receiving unit, to exchange the received signals/data with a remote evaluation unit immediately or with a time delay (after intermediate storage in a buffer storage facility).

A device according to the second aspect can be used for example in a pig for pipeline inspection.

A third aspect relates to the use of a device or of a pig according to the second aspect for checking an object, in particular a pipe wall, for flaws.

BRIEF DESCRIPTION OF THE FIGURES

Exemplary embodiments of the invention are described below with the help of the following figures.

DETAILED DESCRIPTION

Embodiments of the claimed invention are described below with reference to FIGS. 1 and 2.

Figure 1:
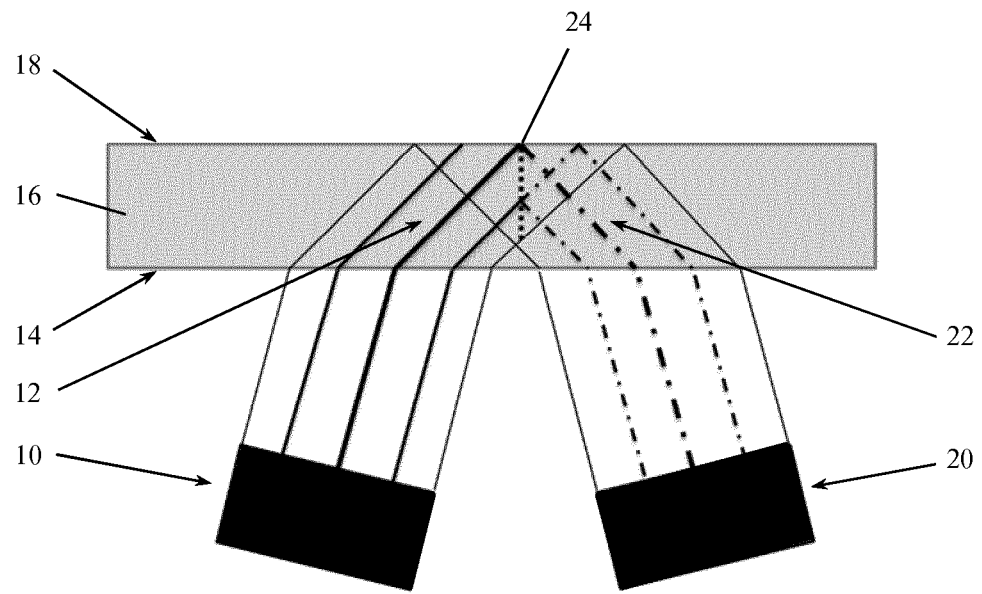
FIG. 1 shows an ultrasound method carried out on an object with a crack running substantially perpendicular to the surfaces of the object.

FIG. 1 shows a device, in which a first ultrasonic transducer 10 emits a first ultrasonic signal 12 towards a first surface 14 of an object 16. In this example the object 16 is a pipe wall and the first surface 14 is formed by the inside of the pipe.

In this example the ultrasonic signal 12 is a pulsed signal or otherwise modulated signal. The first transducer 10 can be embodied for example as piezo-electric transducer. It can function both as transmitter and as receiver.

The thus emitted signal 12 enters the object 16 via the first surface 14 in the form of the inside of the pipe and passes through the object 16 in a first direction, until it hits a second surface 18 of the object 16. In this example the second surface 18 is formed by the outside of the pipe. In this connection the ultrasonic signal 12 emitted by the transducer 10 usually propagates itself as transverse/shear wave in the object 16.

The signal 12 propagating itself in the first direction forms a first angle of about 45 degrees with the inside of the pipe.

On the second surface 18 the signal is reflected at least in part and returns to the first surface 14 of the object 16 as first response signal 22 in a second direction, where it exits the object 16 at least in part and is received by a second ultrasonic transducer 20.

The second transducer 20 can for example likewise be embodied as piezo-electric transducer. The second transducer 20 can also function both as transmitter and as receiver.

In this connection the response signal 22 running in the second direction forms a second angle of likewise about 45 degrees with the inside of the pipe. It is evident that the beam path is substantially symmetrical, and the first angle coincides substantially with the second angle.

In the set-up shown in FIG. 1 a crack 24 running perpendicular to the surfaces 14, 18 of the object 16 is located in the beam path. This crack 24 leads to a shading/attenuation of the response signal 22 received in the second ultrasonic transducer 20 and specifically to a reduction in the detected amplitude of the response signal 22.

Figure 2:
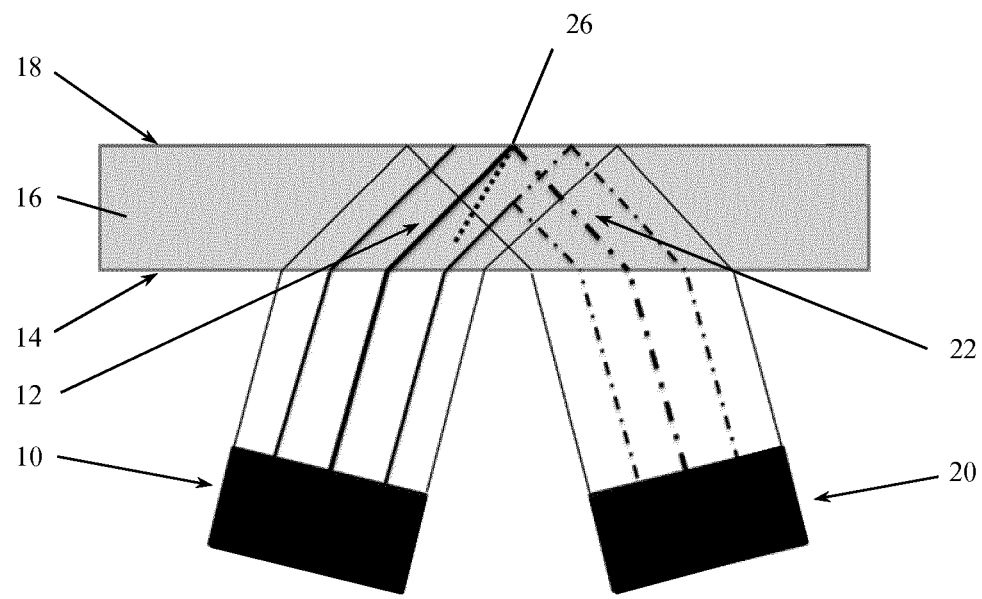
FIG. 2 shows an ultrasound method carried out on an object with a crack running obliquely to the surfaces of the object.

This principle leads also to a positive detection of the flaw shown in FIG. 2. The construction and in particular the position/orientation of the two transducers 10, 20 is comparable with that in FIG. 1. However, the crack 26 shown in FIG. 2 runs obliquely (i.e. not perpendicularly) to the surfaces 14, 18 of the object 16. Here also there is a resulting shading/attenuation of the response signal 22 received in the second ultrasonic transducer 20 and specifically a reduction in the detected amplitude of the response signal 22.

In addition, the first ultrasonic transducer 10 can also be operated in a "classic" pulse-echo method. In this connection in FIG. 1 the first ultrasonic transducer 10 receives a second response signal (not shown) coming from the first direction, said signal being formed substantially by the echo on the crack 24. In FIG. 2 the first ultrasonic transducer 10 receives, if at all, only a significantly weaker second response signal in comparison with the situation in FIG. 1, said signal being formed substantially by the echo on the crack 26.

With the "classic" pulse-echo method the crack 26 shown in FIG. 2 would thus be totally undetectable or detectable only with significantly greater effort. Moreover, the determination of depth by means of the "classic" pulse-echo method is not possible with corresponding accuracy.

In contrast even obliquely running flaws can be detected and even quantified with the afore-described method.

Through the combination of both measuring methods the probability and accuracy of detection can be increased further.

A further improvement in the probability and accuracy of detection can be achieved by insonifying the object 16 in both forward and backward direction. In this connection a second signal (not shown) is generated in the second direction in the object 16 by means of the second ultrasonic transducer 20 either at the same time or alternately with the emitting of the first signal 12. The first ultrasonic transducer 10 then receives a third response signal, coming from the object from the first direction and induced by the second signal. Additionally, the second ultrasonic transducer 20 emitting the second signal can also receive a fourth response signal (as pulse-echo signal) in response to the second signal, in order to increase the evaluation accuracy further.

The necessary control of the transducers and also the signal storage/evaluation have not been described explicitly and can be realised in various ways, which are known to the skilled person.

The invention claimed is:

1. A method for inspecting a pipeline, for flaws, wherein the method comprises the following steps:
    emitting of a first signal running in a first direction in the pipeline by means of a first ultrasonic transducer; and
    receiving of a first response signal coming from a second direction in the pipeline by means of a second ultrasonic transducer,
    wherein the first direction and the second direction are different from each other;
    wherein the method further comprises the steps of:
    arranging of the first ultrasonic transducer and of the second ultrasonic transducer on the inside of the pipeline;
    receiving of a second response signal coming from the first direction in the pipeline, in response to the first signal, by means of the first ultrasonic transducer;
    emitting of a second signal running in the second direction in the pipeline by means of the second ultrasonic transducer; and
    receiving, in response to the emitting of the second signal, of a third response signal coming from the first direction in the pipeline by means of the first ultrasonic transducer.

2. The method according to claim 1, wherein the first direction and the second direction each form substantially the same angle with the side of the pipeline facing the ultrasonic transducers.

3. The method according to claim 1, comprising further the step of the receiving of a fourth response signal coming from the second direction in the pipeline, in response to the second signal, by means of the second ultrasonic transducer.

4. The method according to any one of the preceding claims, comprising further the step of the storing and evaluating of the first, second, third and/or a fourth response signal to characterise a flaw, wherein the fourth response signal is a signal coming from the second direction in the pipeline that is received by the second ultrasonic transducer in response to the second signal.

5. A device for inspecting a pipeline for flaws, comprising:
    a first ultrasonic transducer, a second ultrasonic transducer, and a control unit configured to control the first transducer and the second transducer;
        wherein the first ultrasonic transducer is configured to emit a first signal running in a first direction in the object;
        wherein the second ultrasonic transducer is configured to receive a first response signal coming from a second direction in the object;
    wherein the first direction and the second direction are different from each other;
    wherein the first ultrasonic transducer and the second ultrasonic transducer are arranged on the inside of the pipeline;
    wherein the first ultrasonic transducer is configured to receive a second response signal coming from the first direction in the pipeline, in response to the first signal;
    wherein the second ultrasonic transducer is configured to emit a second signal running in the second direction in the pipeline; and
    wherein the first ultrasonic transducer is configured to receive a third response signal coming from the first direction in the pipeline by means of the first ultrasonic transducer, in response to the emitting of the second signal.

6. The device according to claim 5, wherein the first direction and the second direction each form substantially the same angle with the side of the pipeline facing the ultrasonic transducers.

7. The device according to claim 5, wherein the second ultrasonic transducer is configured to receive a fourth response signal coming from the second direction in the pipeline, in response to the second signal.

8. The device according to claim 5, comprising further a storage facility and an evaluation unit to store and evaluate the first, second, third and/or a fourth response signal to characterise a flaw, wherein the fourth response signal is a signal coming from the second direction in the pipeline that is received by the second ultrasonic transducer in response to the second signal.

9. A pig for pipeline inspection with a device according to claim 5, wherein the pig is configured to be inserted into a pipeline and to inspect the wall of the pipeline from the inside.

* * * * *